United States Patent [19]
Lee

[11] 3,883,216
[45] May 13, 1975

[54] HOLOGRAPHIC MEMORY HAVING SPHERICAL RECORDING MEDIUM

[75] Inventor: Tzuo-Chang Lee, Bloomington, Minn.

[73] Assignee: Honeywell, Inc., Minneapolis, Minn.

[22] Filed: Apr. 11, 1974

[21] Appl. No.: 459,996

[52] U.S. Cl. .......... 350/3.5; 340/173 LM
[51] Int. Cl. .......... G02b 27/00
[58] Field of Search .......... 350/3.5, 162 SF; 340/173 LT, 173 LM; 179/100.3 G; 250/550

[56] References Cited
UNITED STATES PATENTS

| | | | |
|---|---|---|---|
| 3,488,101 | 1/1970 | Van Ligten et al. | 350/3.5 |
| 3,698,010 | 10/1972 | Lee | 350/3.5 |
| 3,706,080 | 12/1972 | Lee | 350/3.5 |
| 3,720,453 | 3/1973 | Lee | 350/3.5 |

*Primary Examiner*—Ronald J. Stern
*Attorney, Agent, or Firm*—David R. Fairbairn

[57] ABSTRACT

In a holographic memory, a substantially constant angle is maintained between the object beam and the reference beam at the memory medium. The object beam is pivoted about an object beam pivot point and the reference beam is pivoted about a reference beam pivot point. The memory medium has a curved surface which is proximate a portion of a space.

17 Claims, 12 Drawing Figures

HOLOGRAPHIC MEMORY HAVING SPHERICAL RECORDING MEDIUM

BACKGROUND OF THE INVENTION

This invention relates to holography, and in particular to a holographic optical memory. In this specification, the term "light" is used to mean electromagnetic waves within the band of frequencies including infrared, visible, and ultraviolet light.

A holographic memory makes use of a memory medium upon which many individual holograms are stored. Each hologram represents a different bit pattern or "page." The information is stored by directing two beams to a desired location on the memory medium. One beam, the object beam, contains a bit pattern formed by a page composer, while the second beam acts as the reference beam necessary for holographic storage. To read out the information, a readout beam selectively illuminates one of the holograms stored, thereby producing a reconstructed image of the bit pattern stored in the hologram. An array of photodetectors is positioned to detect the individual bits of the bit pattern.

The holographic memory is an extremely attractive form of mass memory. In a "bit-by-bit" type of optical memory, a single recorded spot on the memory medium represents only one information bit. In a holographic memory, on the other hand, a single hologram recorded on the same memory medium represents a page which may contain as many as $10^5$ bits. Memories having $10^5$ or $10^6$ pages have been proposed, with each page containing about $10^5$ bits.

Another advantage of the holographic memory is that the information stored in the hologram is stored uniformly throughout the hologram rather than in discrete areas. The hologram is thus relatively insensitive to blemishes or dirt on the memory medium. A small blemish or dust particle on the memory medium cannot obscure a bit of digital data as it can in a bit-by-bit memory.

One of the difficulties encountered in the development of a holographic memory has been finding a suitable memory medium. The memory medium must be erasable, must maintain its properties for a large number of write-read-erase cycles, and must have a relatively high diffraction efficiency. One memory medium which has received considerable attention is a photoconductor-thermoplastic memory medium. The principles of storage on a photoconductor-thermoplastic medium have been discussed by L. H. Lin and H. L. Beauchamp, "Read-Write-Erase in Situ Optical Memory Using Thermoplastic Holograms," *Applied Optics*, 9, 2088 (1970); J. C. Urbach and R. W. Meier, "Thermoplastic Xerographic Holography," *Applied Optics*, 5, 666 (1966); and P. L. Credell and F. W. Spong, "Thermoplastic Media for Holographic Recording," *RCA Review*, 33, 206 (1972). Thermoplastic holograms are erasable and have a relatively high diffraction efficiency. In addition, thermoplastic and photoconductor materials are being developed which can sustain a large number of write-read-erase cycles.

One troublesome problem with thermoplastic holographic storage is the bandpass nature of the spatial frequency response. The maximum response is centered at a spatial frequency given by $1/(2h)$, where $h$ is the thermoplastic thickness. The response falls off rather quickly toward high and low spatial frequencies, as described by W. C. Stewart et al, "An Experimental Read-Write Holographic Memory," *RCA Review*, 34, pages 35 through 39 (1973). The spatial frequency is determined by the angle between the reference beam and the object beam used for holographic storage. Since it is very important that each of the many holograms stored in the holographic memory have about the same holographic readout efficiency, it is imperative that a nearly constant angle be maintained between the reference beam and the object beam during recording of each of the holograms.

This requirement presents a problem when a holographic memory of any substantial size is contemplated. In typical alterable holographic memory systems, the light beam from the light source is deflected and then split into the reference and object beams by a beam splitter. The object beam passes through a page composer, which creates a pattern of bits to be stored in the particular hologram. The object beam and the reference beam are then brought together at the memory medium and interfere to store a hologram in the memory medium. Systems of this type are shown in U.S. Pat. No. 3,706,080 by T. C. Lee and in the above-mentioned article by W. C. Stewart et al, especially at pages 5 and 43.

The problem with this type of holographic memory is that the angle between the reference beam and the object beam varies for the different positions on the memory medium. When the memory medium contains a large number of different storage positions, the angle between the reference beam and the object beam can vary quite considerably. If the memory medium has a limited spatial bandwidth, this presents a significant problem.

Some prior art holographic systems have maintained a constant angle between the reference beam and the object beam. An example of this type of system is described in U.S. Pat. No. 3,675,983 by J. T. LaMacchia. In this holographic memory, the optical recording system is physically shifted for each hologram that is recorded. While this maintains an essentially constant angle during recording of the holograms, it is very slow and inconvenient. The LaMacchia system is useful in permanent storage memories in which the writing stage can be very slow since it is only done once. The reading stage of operation in LaMacchia's system is the only stage of operation involving high speed operation. This sort of approach, however, is not useful in an alterable holographic memory in which writing, reading, and erasing of holograms are performed.

SUMMARY OF THE INVENTION

The holographic memory of the present invention maintains a substantially constant angle between the object beam and the reference beam. This is achieved by the use of a curved memory medium and a reference beam which is pivoted about a reference beam pivot point.

The memory medium has a plurality of locations at which holograms may be stored. The curved surface of the memory medium is proximate a portion of a sphere which has a diameter along the optical axis of the object beam channel.

The reference beam pivot point is related to the curvature of the memory medium. The reference beam pivot point is at a position proximate the previously defined sphere.

DESCRIPTION OF THE PREFERRED EMBODIMENTS

Figure 1:
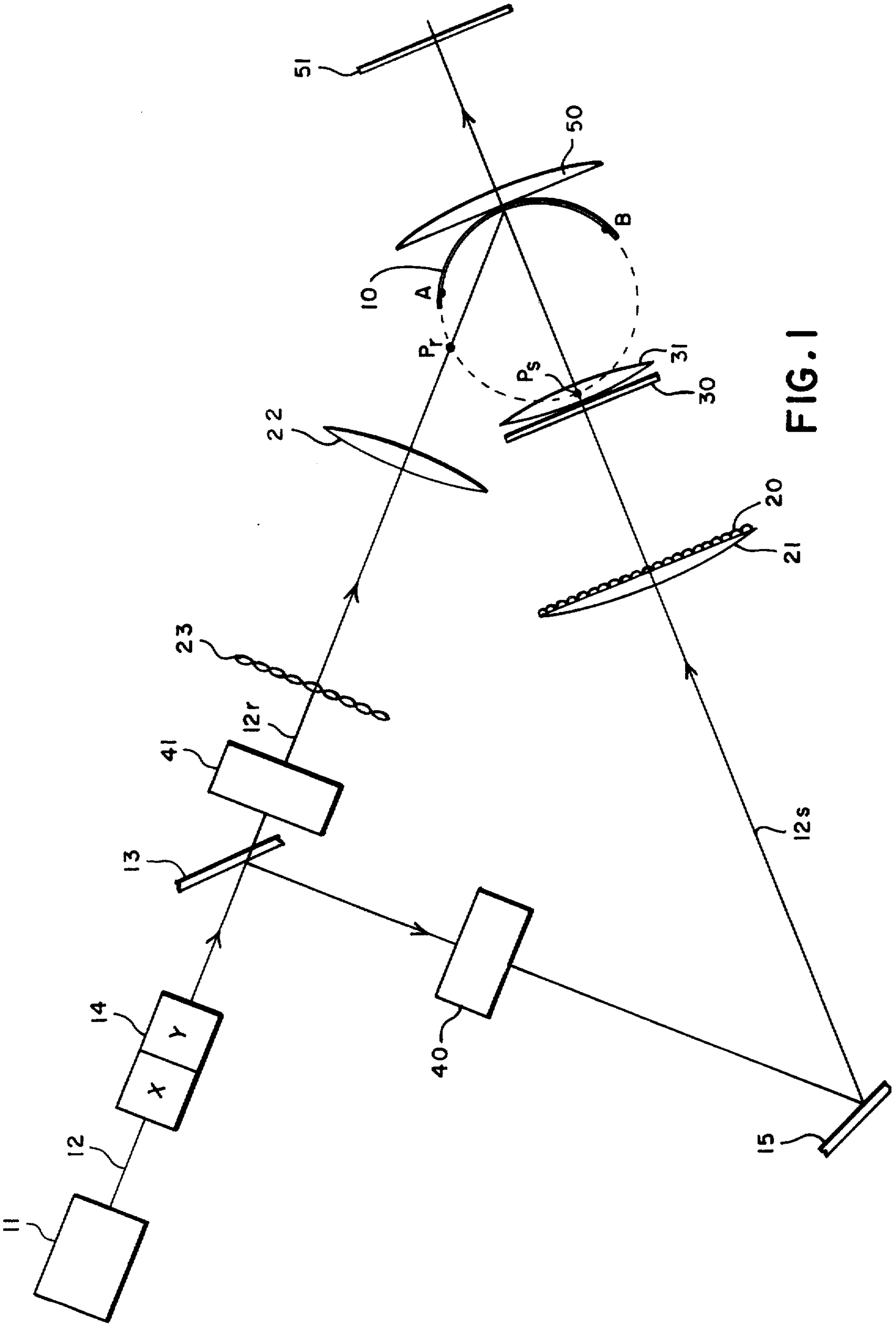
FIG. 1 diagramatically shows a holographic memory including one embodiment of the present invention.

FIG. 1 shows a holographic memory representing one embodiment of the present invention. Memory medium 10, which has a curved surface, is provided for the storage of holograms at a plurality of locations. As shown in FIG. 1, the curved surface of memory medium 10 is proximate a portion of the sphere which has a diameter along the optical axis of the object beam channel. The imaginary sphere is extended by dashed lines and appears as a circle in FIG. 1. In the present invention, the center of the sphere will be proximate the optical axis of the object beam channel. The particular location of the center of the sphere (in other words the radius of the sphere) determines in part how nearly constant the angle between the object beam and reference beam is maintained.

Memory medium 10 may be one of a variety of different recording media. For example, memory medium 10 may be a thermoplastic recording medium, a magnetic film, a photochromic film, or a photographic film.

Light source means 11 provides a coherent light beam 12 which is split by beam splitter 13 into reference beam 12*r* and object beam 12*s*. These two beams are necessary for holographic recording.

Beam directing means simultaneously direct reference beam 12*r* along a reference beam channel and object beam 12*s* along an object beam channel. The two beams 12*r* and 12*s* coincide at selected locations of memory medium 10 during the writing stage of operation. In FIG. 1, the object beam 12*s* is shown as a single ray propagating along the optical axis of the object beam channel. Similarly, reference beam 12*r* is shown as a single ray propagating along the optical axis of the reference beam channel.

The beam directing means may comprise a number of optical elements well known in the field of holography. In the particular embodiment shown in FIG. 1, the beam directing means includes light beam deflector system 14, mirror 15, array of individual lenses 20, object beam pivoting lens 21, reference beam pivoting lens 22, and array of individual lenses 23.

Light beam deflector system 14 is positioned between light source 11 and beam splitter 13 for deflecting reference beam 12*r* and object beam 12*s* to a plurality of resolvable spots. Light beam deflector system 14 may comprise acousto-optic, electro-optic or mechanical light beam deflectors and may be of the angular deflection type or of the translation type. In its preferred form, light beam deflector system 14 is capable of deflecting beams 12*r* and 12*s* into two dimensions, hereafter referred to as the *x* and *y* directions.

Mirror 15 may be positioned in the path of either reference beam 12*r* or object beam 12*s*. Mirror 15 changes the direction of propagation of one of the beams so that they may converge on a common location of memory medium 10.

The array of individual lenses 20 is positioned in the path of object beam 12*s*. The array may comprise a hololens or, as shown in FIG. 1, may consist of a panel of flys eye lenses. Each lens is positioned at one of the plurality of resolvable beam positions. The size of each lens preferably is equal to that of one resolvable spot. The function of the individual lenses is to reduce the beam diameter of the resolved spot such that the ratio of the original spot size to the reduced spot size is equal to or greater than the number of resolution elements needed to form one hologram. A Fourier transform hologram should have a minimum linear size of $3\lambda L/d$, where $d$ is the bit to bit spacing, $\lambda$ is the wavelength of the light, and L is distance between the object and the hologram. The resolution in the hologram is $\lambda L/D$ so that the hologram needs a minimum of $9N^2$ resolution spots, where D is the linear dimension of the object and N is the total number of bits in one dimension. If the diameter of an individual lens in the flys eye lens panel is A and the focal length f, then the condition $((A^2)/\lambda f)^2 \geq 9N^2$ must be satisfied.

Object beam pivoting lens 21 pivots the deflected object beam 12*s* about object beam pivot point $P_s$. In other words, no matter what position object beam 12*s* is deflected to, pivoting lens 21 pivots object beam 12*s* so that the central ray of object beam 12*s* passes through pivot point $P_s$. In the preferred embodiment shown as FIG. 1, pivoting lens 21 is in physical contact with the array of individual lenses 20. It should be understood, however, that pivoting lens 21 may be separate from the array of the individual lenses 20.

Reference beam pivoting lens 22 pivots the deflected reference beam 12*r* about reference beam pivot point $P_r$. In other words, the central ray of reference beam 12*r* passes through pivot point $P_r$ no matter what position reference beam 12*r* is deflected to.

The position of pivot points $P_r$ and $P_s$ with respect to memory medium 10 is critical to the present invention. In FIG. 1, pivot points $P_r$ and $P_s$ and the surface of memory medium 10 lie approximately on a common sphere. This allows a substantially constant angle to be maintained between object beam 12*s* and reference beam 12*r* during recording on various locations of memory medium 10.

Depending upon the radius of the sphere, pivot point $P_s$ may not be located proximate the sphere. It is important, however, that reference beam pivot point $P_r$ and the surface of memory medium 10 be located proximate a common sphere. FIG. 1 shows the ideal case in which pivot point $P_s$ also lies proximate the common sphere. In the ideal case, tha angle between the reference beam 12*r* and object beam 12*s* is constant. In non-ideal cases, in which pivot point $P_s$ does not lie on the common sphere, the angle between object beam 12*s* and reference beam 12*r* will vary as a function of location. Both the ideal and non-ideal cases will be discussed later.

Page composer 30 and Fourier transform lens 31 are positioned in the path of object beam 12*s* proximate first pivot point $P_s$. Page composer 30 creates a bit pattern in object beam 12s during the writing stage of operation. Fourier transform lens 31 performs a Fourier transform of the bit pattern. Page composer 30 may be positioned such that object beam 12s passes through page composer 30 prior to or after object beam 12s passes through Fourier transform lens 31.

Beam intensity control means, which is shown in FIG. 1 as individual light modulators 40 and 41, allows the combined intensity of object beam 12s and reference beam 12r to be sufficient to store the bit pattern as a hologram during the writing stage of operation. During the reading stage of operation, the intensity of light incident upon the hologram must be insufficient to alter the hologram. Although two modulators are specifically shown in FIG. 1, it is to be understood that in some embodiments of the present invention, a single modulator which is positioned between light source 10 and beam splitter 13 may comprise the beam intensity control means.

The readout system shown in FIG. 1 includes a readout pivoting lens 50 and a detector array 51. Readout pivoting lens 50 is positioned proximate memory medium 10 to pivot the diffracted portion of the readout beam from any one of the plurality of holograms into a common reconstructed image plane. The detector array 51 is positioned at the common reconstructed image plane, with each detector positioned to receive the light representing one bit of the bit pattern. Each detector provides an output signal indicative of the intensity of the light received. This readout system is similar to that described in U.S. Pat. No. 3,706,080 by T. C. Lee. While this particular readout system has many advantages, it will be understood that other readout systems may also be used in conjunction with the holographic memory of the present invention.

Figure 2A:
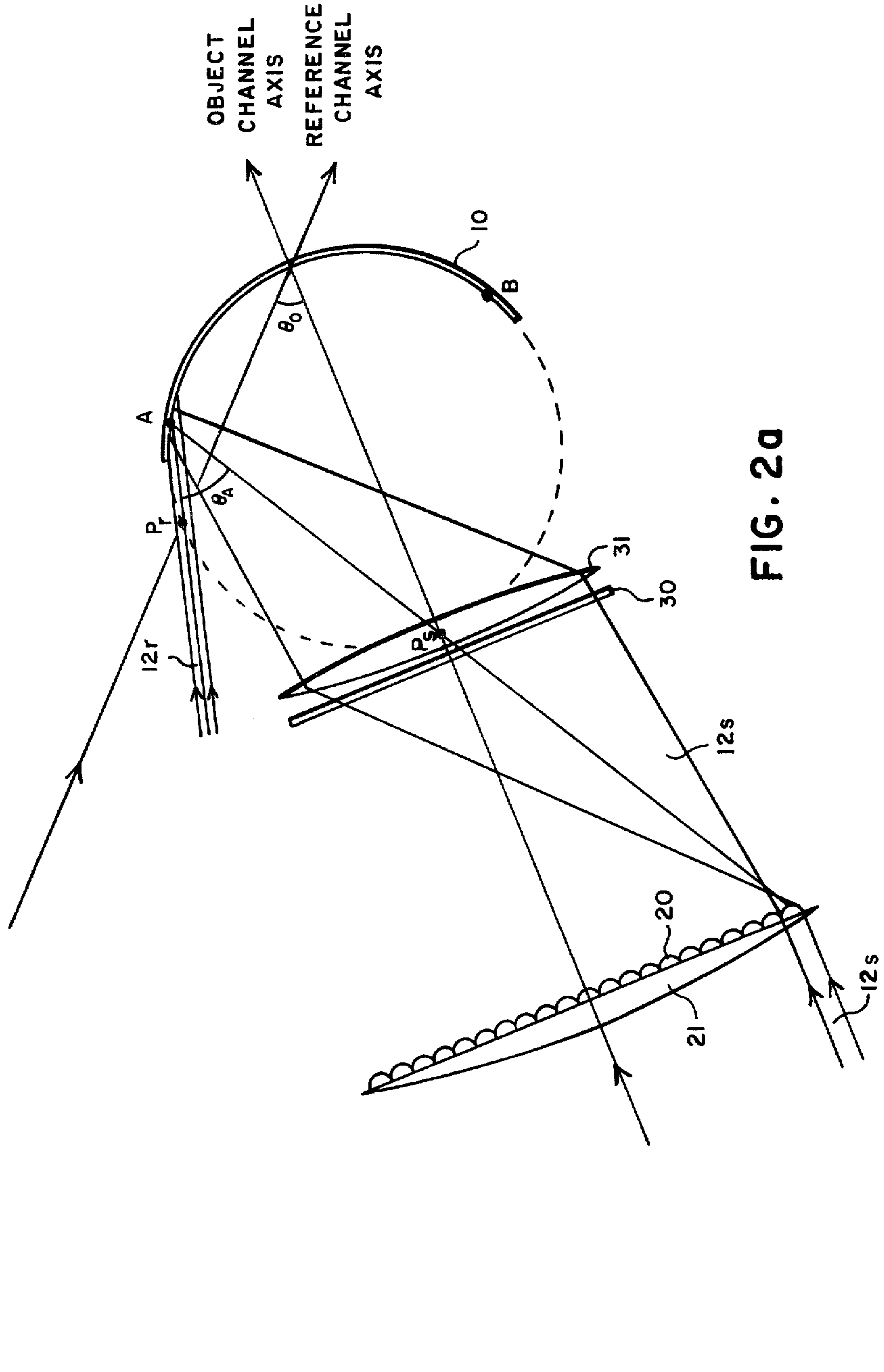
FIGS. 2*a* and 2*b* show the pivoting of the object and reference beam in a holographic memory with a memory medium of the preferred curvature.
Figure 2B:
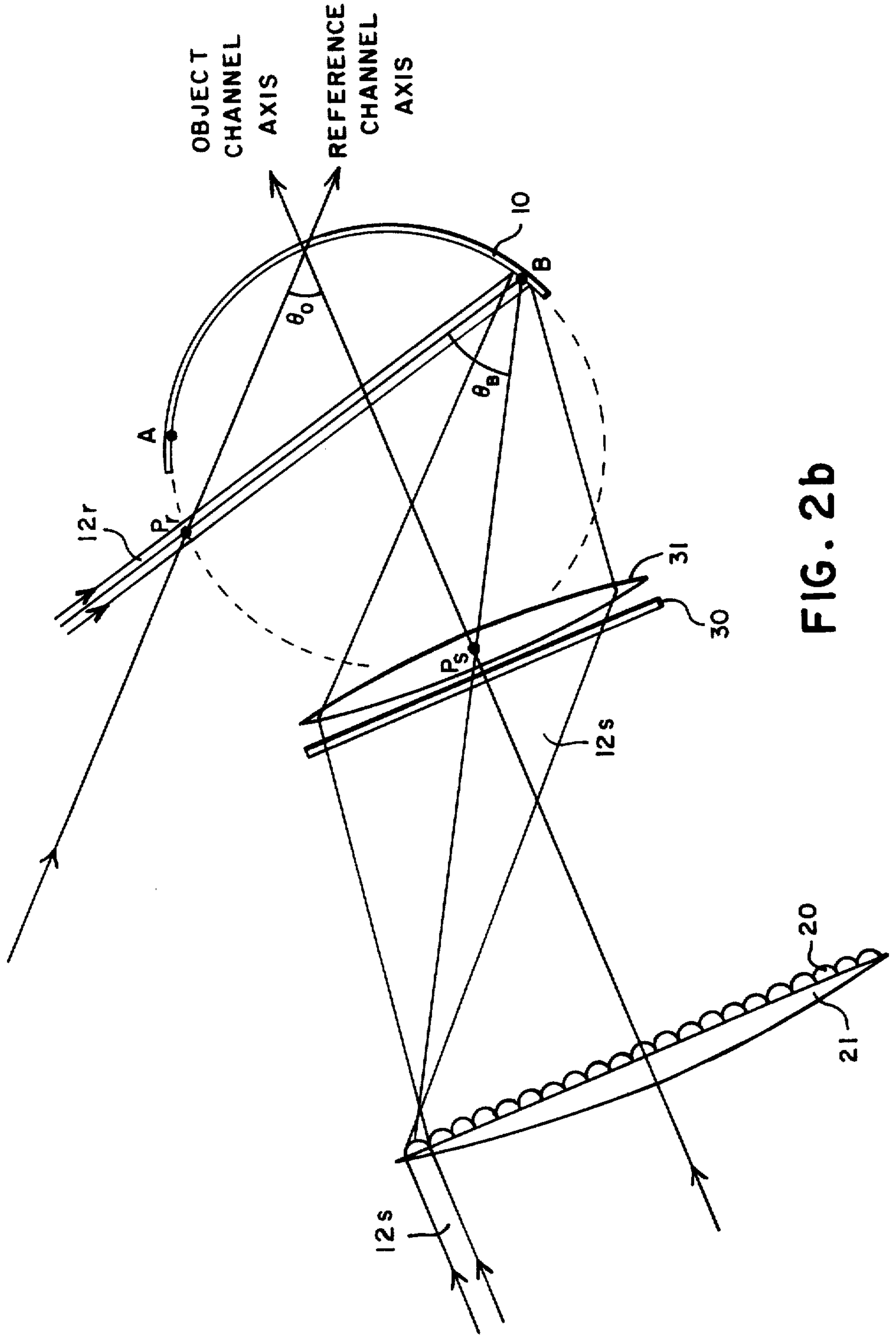

To better illustrate the operation of the present invention in achieving a substantially constant angle between object beam 12s and reference beam 12r, two examples are shown in FIGS. 2a and 2b. In each of these examples, only that portion of the memory system of FIG. 1 which is of direct interest is shown. In other words, FIGS. 2a and 2b only show memory medium 10, the array of individual lenses 20, object beam pivoting lens 21, page composer 30, Fourier transform lens 31, and focusing lens 32.

In FIG. 2a, reference beam 12r and object beam 12s are directed to extreme memory location A on memory medium 10. The outermost rays and the central ray of object beam 12s and reference beam 12r are shown. Pivoting lens 21 pivots object beam 12s so that the central ray of object beam 12s passes through pivot point $P_s$ as it passes to extreme location A. Similarly, the reference beam is pivoted about pivot point $P_r$ so that the central ray of reference beam 12r passes through $P_r$ on its way to location A. The angle between the central rays of object beam 12s and 12r is $\theta_A$.

FIG. 2b shows object beam 12s and reference beam 12r addressing a second extreme location B on memory medium 10. As in FIG. 2a, object beam 12s and reference beam 12r are pivoted so that their central rays pass through $P_s$ and $P_r$, respectively. The angle between the central rays of object beam 12s and reference beam 12r is $\theta_B$.

It can be shown by a simple geometric proof that angle $\theta_A = \theta_B = \theta_0$, where $\theta_0$ is the angle between the optical axes of the reference and object channels. In fact, the angle between the central rays of the object and reference beams 12s and 12r remains constant for any memory location in this ideal case.

It can be seen that the bandwidth requirement for a holographic memory medium may be reduced by (a) using angularly deflected rather than parallelly deflected reference beams, and (b) using a spherical rather than a flat storage surface. The angularly deflected (i.e., pivoted) reference beams are needed in order to have the reference beam forming a nearly constant angle with respect to the object beam for all beam pairs. A spherical rather than flat storage surface is needed in order to have the object and reference beam pairs always merge correctly at the memory medium.

Although the ideal arrangement shown in FIGS. 1 and 2 provides the minimum bandwidth requirements, this may not be an optimum arrangement from the viewpoint of lens design or from the standpoint of making the memory medium. Reduction of the spatial bandwidth requirements may also be achieved, however, by the use of a curved memory medium having a radius of curvature larger than that of the ideal arrangement.

Figure 3A:
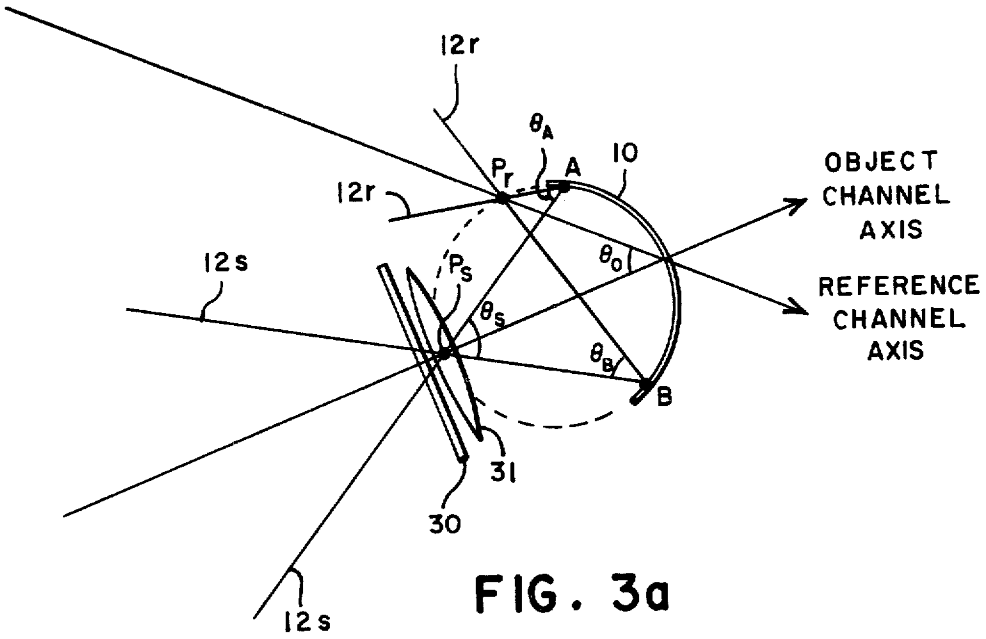
FIGS. 3*a*, 3*b*, 3*c*, and 3*d* show the angles formed between the object and reference beams at the extreme storage locations of memory media having different amounts of curvature.
Figure 3B:
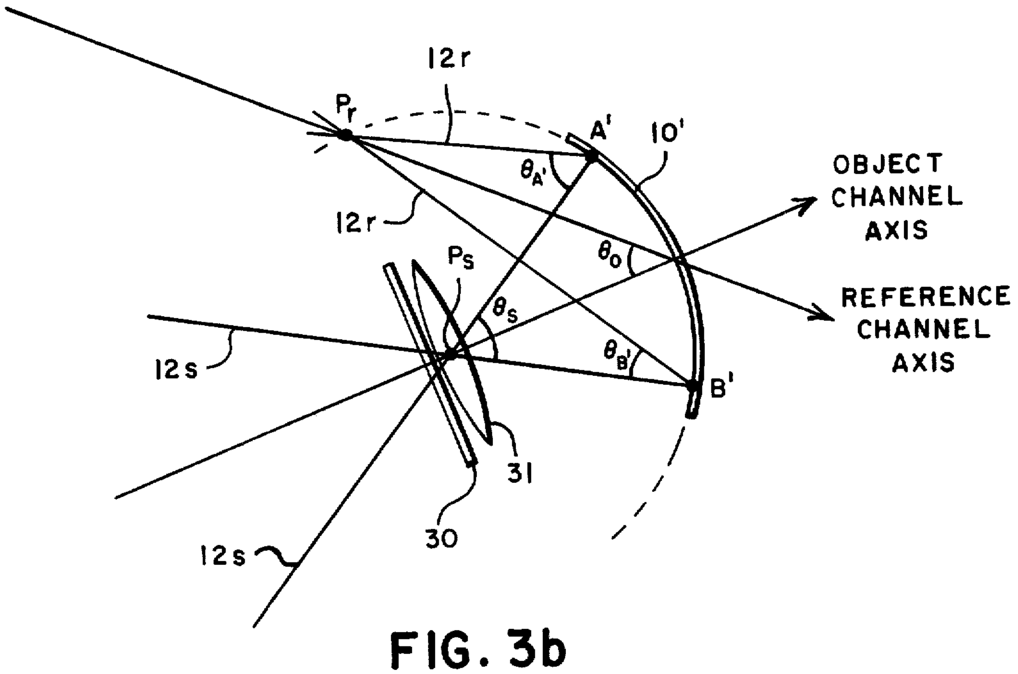
Figure 3C:
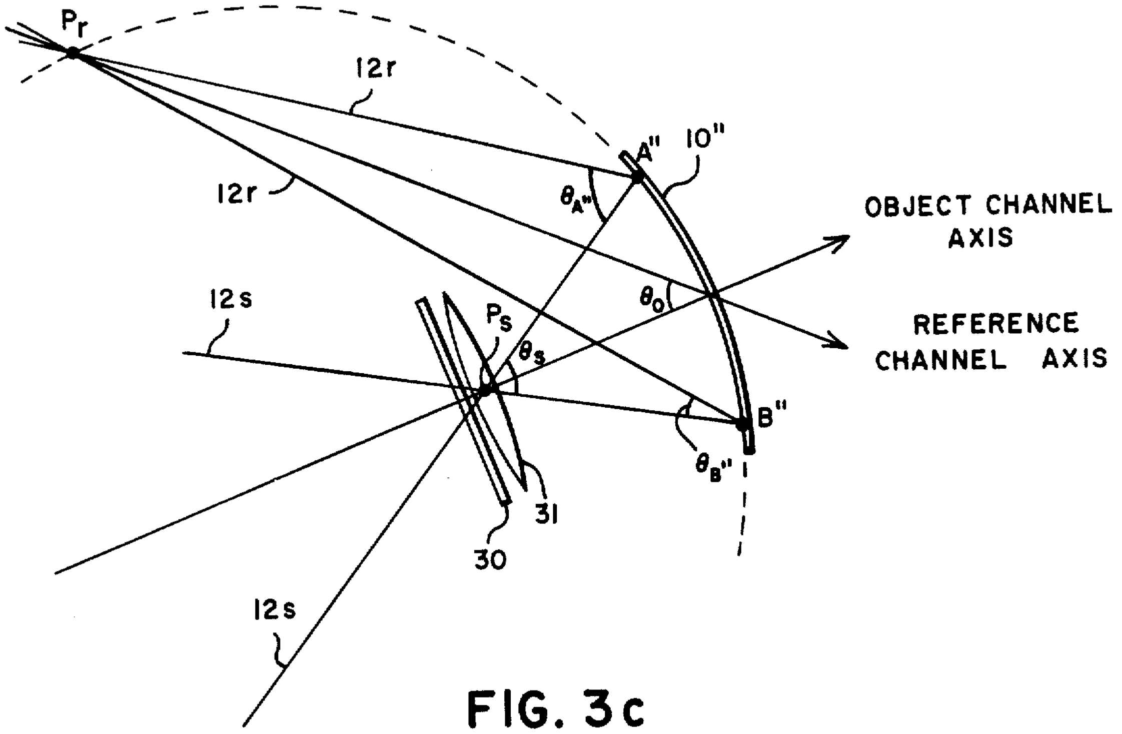
Figure 3D:
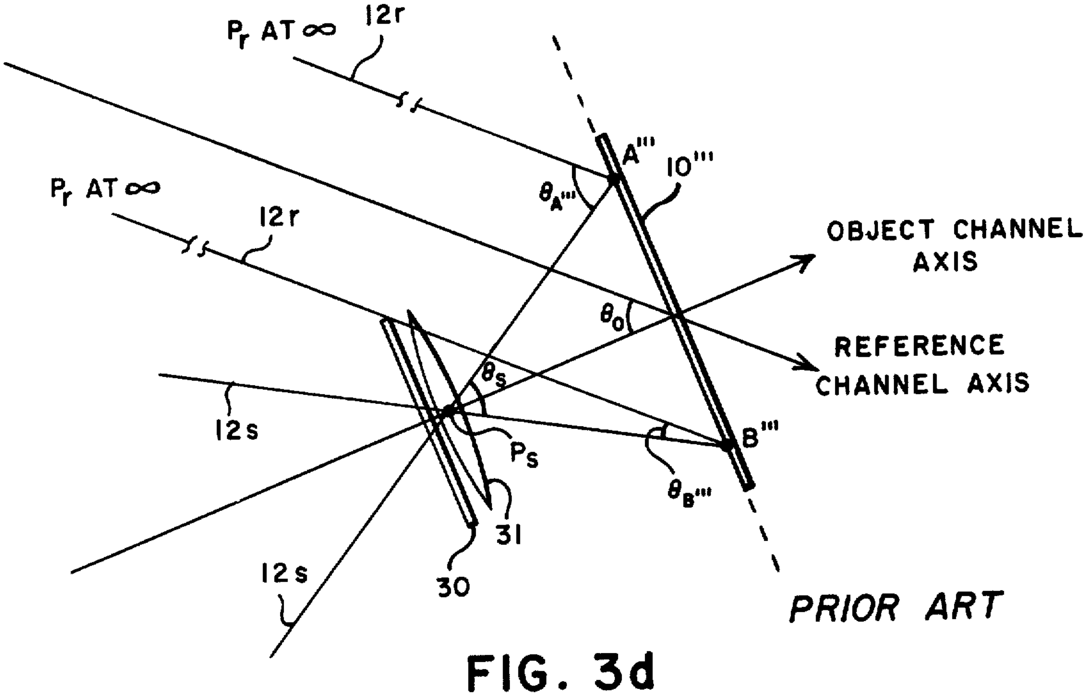

FIGS. 3a, 3b, 3c, and 3d, show the angles formed between the reference beam 12r and object beam 12s for several memory systems. In FIGS. 3a-3d only the central ray of the object and reference beams 12s and 12r are shown for the two extreme memory positions. FIG. 3a shows the ideal arrangement which has previously been shown in FIGS. 1 and 2. FIG. 3d shows the prior art arrangement using a flat storage surface and parallelly deflected reference beams. FIGS. 3b and 3c show embodiments of the present invention in which the radius of curvature of memory medium 10 is greater than the ideal case of FIG. 3a and less than infinity, as in FIG. 3d.

In FIG. 3a, memory medium 10 and pivot points $P_r$ and $P_s$ lie on a common sphere. The angle between reference beam 12r and object beam 12s is equal to $\theta_0$ at all memory locations. One other angle which is of interest in other, non-ideal cases is the angle between the central rays of object beam 12s for the two memory locations A and B. This angle is defined as $\theta_s$ in the ideal case.

FIG. 3b shows a memory medium 10′ having a larger radius of curvature. As in FIG. 3a, the center of the sphere lies on the optical axis of the object beam channel. The center of the sphere in FIG. 3b has been selected to correspond to pivot point $P_s$. In other words, the radius of curvature is twice that of FIG. 3a.

From FIG. 3b it can be seen that the angles between the reference and signal beam are no longer constant. Angle $\theta_{A'}$, which is the angle made by the reference and object beams at extreme location A′ is the largest angle and angle $\theta_{B'}$ is the smallest angle. It can be shown that $\theta_{A'} = \theta_0 + \theta_s/4$ and $\theta_{B'} = \theta_0 - \theta_s/4$.

In FIG. 3c the radius of curvature of memory medium 10″ is four times the radius of FIG. 3a. As in FIG. 3a and 3b, the reference beam pivot point $P_r$ is at a position proximate the sphere. In FIG. 3c the difference between the angle of the object and reference beam has become even greater. $\theta_{A''}$ is larger than $\theta_{A'}$ while $\theta_{B''}$ is smaller than $\theta_{B'}$.

In the prior art configuration shown in FIG. 3d, a flat memory medium 10‴ is used. In this case, the radius of curvature is infinite and the pivot point $P_r$ for reference beam 12r, therefore, is at infinity. In other words, reference beam 12r is a parallelly rather than angularly deflected beam. This case represents the worst case for keeping the angles nearly constant. Angle $\theta_A'''$ is even larger than $\theta_A''$, while angle $\theta_B'''$ is even smaller than $\theta_B''$. It can be shown that $\theta_A''' = \theta_0 + \theta_s/2$ and that $\theta_B''' = \theta_0 - \theta_s/2$.

Figure 4:
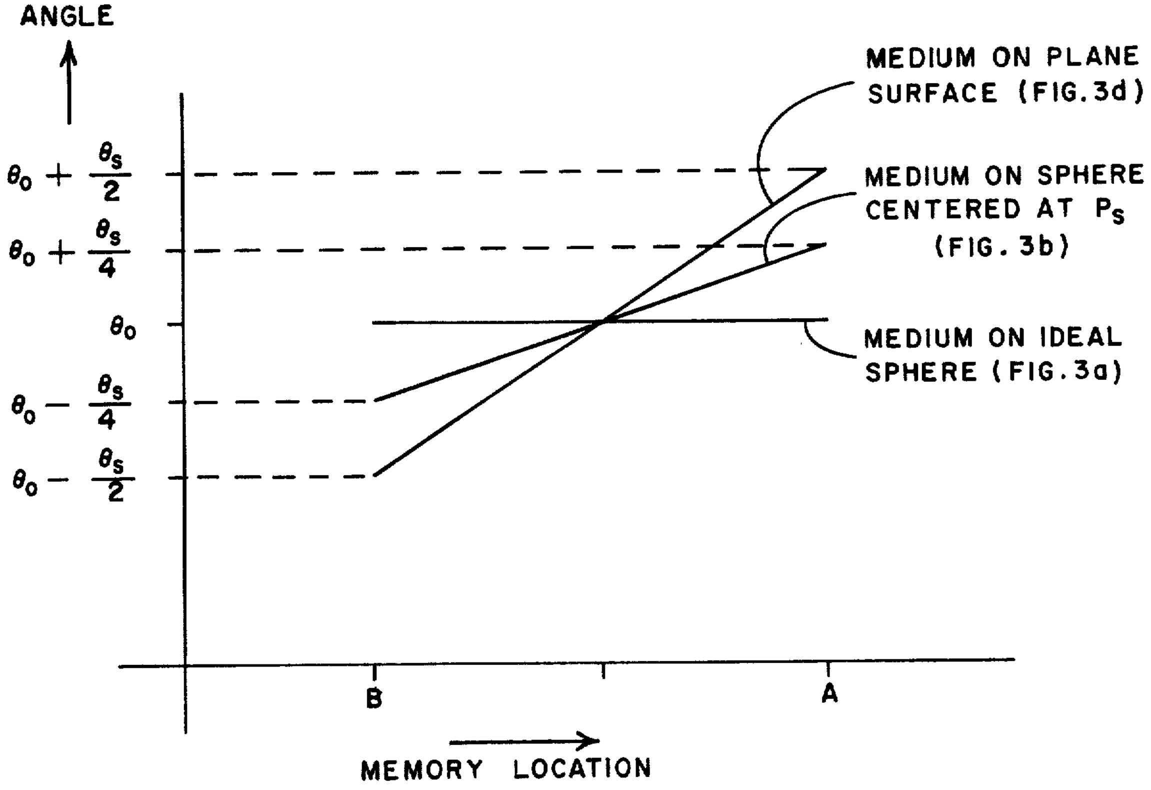
FIG. 4 shows the angle between reference and object beams as a function of location on the memory medium for three different memory media.

The variation of the angle between reference beam 12*r* and object beam 12*s* as a function of memory location is shown in FIG. 4. It can be seen that the prior art arrangement in which memory medium 12 was a plane surface yields the largest variation in angle as a function of memory location. The ideal arrangement of FIG. 3*a*, on the other hand, yields minimum variation. Intermediate arrangements such as those shown in FIGS. 3*b* and 3*c* reduce the bandwidth requirements over that of the prior art arrangement. The particular embodiment of the present invention will depend in part on the bandwidth capabilities of the recording media and considerations of lens design and storage medium fabrication.

The carrier spatial frequency is related to the angle between the beam pair by $$\nu c = \theta/\lambda.$$

The bandwidth needed for tracking the reference signal beams pairs is:

$$\Delta\nu c = \Delta\theta/\lambda = 0 \quad \text{ideal surface (FIG. 3a)}$$
$$= \theta_s/2\lambda \quad \text{center of curvature at } P_r \text{ (FIG. 3b)}$$
$$= \theta_s/\lambda \quad \text{prior art (FIG. 3d)}$$

The total bandwidth required of the storage medium is the sum of $\Delta\nu c$ and the signal beam bandwidth:

$$B = \Delta\nu c + \frac{1}{\lambda F}$$
$$= \frac{1}{\lambda F} \quad \text{ideal surface (FIG. 3a)}$$
$$= \frac{1}{\lambda}\left(\frac{1}{F} + \frac{\theta_s}{2}\right) \quad \text{center of curvature at } P_r \text{ (FIG. 3b)}$$
$$= \frac{1}{\lambda}\left(\frac{1}{F} + \theta_s\right) \quad \text{Prior art (FIG. 3d)}$$

As an example, for f/2 storage optics, $\lambda = 5000$ A, $\theta_s = 30°$, and a spherical storage surface centered at $P_r$, the total bandwidth required is 1500 lines/mm. Using an ideal storage surface the required total bandwidth becomes 1,000 lines/mm. If a plane surface is used for the storage surface, the total bandwidth needed is 2000 lines/mm. In other words, there is a doubling of the bandwidth from the ideal to the worst case.

FIGS. 5*a* through 5*d* show four possible systems for pivoting a parallelly deflected reference beam. In each case the reference beam must be pivoted at point $P_r$ while maintaining a more or less collimated beam. In other words, the reference beam 12*r* are pivoted at point $P_r$ with a total deflection angle of $\theta$, a beam diameter of *d*, and with the beam remaining collimated.

Figure 5A:
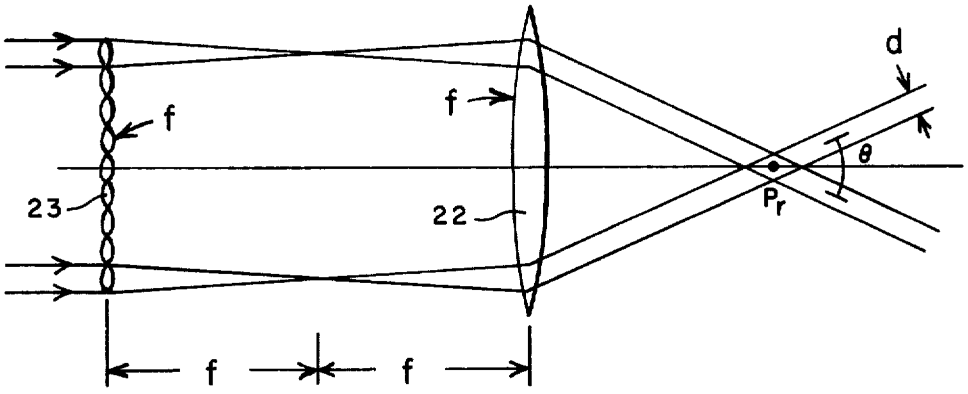
FIGS. 5*a*, 5*b*, 5*c*, and 5*d* show optical systems for pivoting the reference beam.

FIG. 5*a* shows a pivoting system similar to that shown in FIG. 1. At the plane where the parallelly deflected positions or spots are resolved (due to preceeding deflector optics), a flys eye lens array 23 is located. Each lenslet of array 23 has a focal length *f*. At a distance 2*f* is located a large field lens 22 having a focal length *f*. Reference beam 12*r* is pivoted at point $P_r$, which is a distance *f* from field lens 22. It can be shown that the diameter of the final beam is the same as the original beam diameter *d*.

Figure 5B:
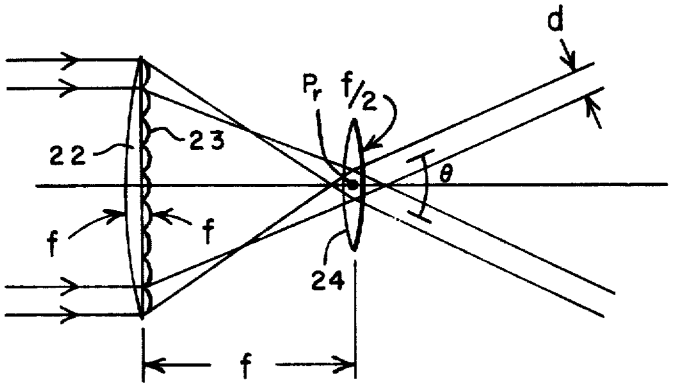

FIG. 5*b* shows another system for pivoting reference beam 12*r*. In this case, both field lens 22 and flys eye array 23 are located at the plane where the parallelly deflected spots are resolved. Collimating lens 24 of focal length *f*/2 is positioned at pivot point $P_r$. Once again the deflection angle is $\theta$ and the final beam diameter is *d*.

Figure 5C:
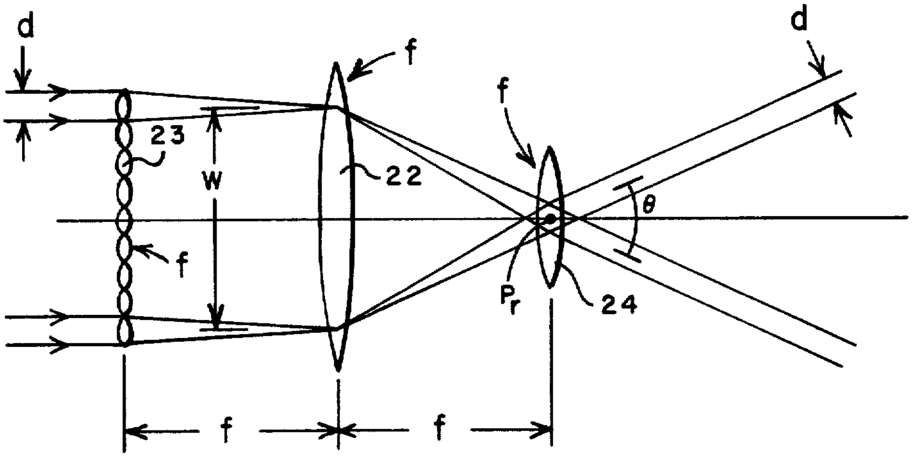

FIG. 5*c* shows pivoting optics again using flys eye array 23, field lens 22 and collimating lens 24. In FIG. 5*c*, all lenses have focal length *f*. Flys eye array 23 is located at the resolvable spot plane, and field lens 22 is located at the focal plane of flys eye lenslet. At position $P_r$, which is a distance *f* from field lens 22, is collimating lens 24. It can be shown that the diameter of the final beam is again the same as the original beam diameter and that deflection angle $\theta = w/f$.

Figure 5D:
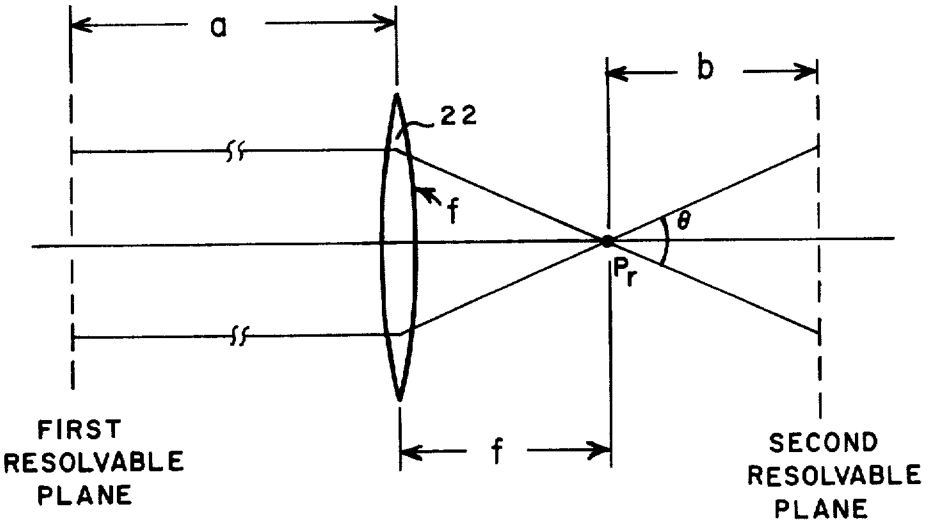

When the pivot point is sufficiently far away, the flys eye lenses of FIGS. 5*a*, 5*b*, and 5*c* are no longer needed. The further $P_r$ is from memory medium 10, the smaller $\theta$ becomes, and thus the longer focal length *f* becomes. In other words, the power of the flys eye lenslets becomes weaker. At the point where the focusing by the flys eye lenslet does not change the focused spot size to any appreciable extent, then the flys eye lenslet is no longer needed. When this point is reached, the pivoting means can be very simple, as shown in FIG. 5*d*. Only a single pivoting lens 22 is needed. If the spot size at the second resolvable plane is the same as the spot size d at the first resolvable plane, then $f = b$ and $a = 2b$.

In conclusion, the present invention reduces bandwidth requirements for holographic memory media. This is achieved by reducing the variation in angle between the object beam and the reference beam for different storage locations. This is achieved by an arrangement of passive optical elements. None of the optical elements used to reduce the bandwidth requirements are required to move during the recording stage of operation, unlike some prior art holographic memory systems.

While this invention has been disclosed with particular reference to the preferred embodiments, it will be understood by those skilled in the art that changes in form and detail may be made without departing from the spirit and scope of the invention. For example, although the reference and object beam pivoting means have been shown as individual lenses or lens systems, those skilled in optics will recognize that pivoting of the beams may also be achieved by other optical devices such as mirrors.

The embodiments of the invention in which an exclusive property or right is claimed are defined as follows:

1. In a holographic memory having a memory medium with a plurality of locations at which holograms may be stored and having an object and a reference beam for forming holograms at each of the plurality of locations on the memory medium, and wherein the object and reference beams are directed along object and reference beam channels, respectively, the improvement comprising:

a memory medium having a curved surface proximate a portion of a sphere, the sphere having a diameter along the optical axis of the object beam channel; and reference beam pivoting means for pivoting the reference beam about a reference beam pivot point proximate the sphere.

2. The invention of claim 1 and further comprising: object beam pivoting means for pivoting the object beam about an object beam pivot point.

3. The invention of claim 2 wherein the holographic memory includes page composer means positioned in the path of the object beam proximate the object beam pivot point.

4. The invention of claim 2 wherein the object beam pivot point is proximate the sphere.

5. The invention of claim 3 and further comprising:

page composer means positioned in the object beam channel proximate the object beam pivot point for creating a bit pattern in the object beam; and Fourier transform lens means positioned in the object beam channel proximate the page composer means for performing a Fourier transform of the bit pattern produced by the page composer means.

6. The invention of claim 2 wherein the object beam pivoting means comprises first lens means.

7. The invention of claim 1 wherein the reference beam pivoting means comprises second lens means.

8. The invention of claim 7 wherein the second lens means includes a lens array.

9. A holographic memory comprising:

light source means for providing a light beam;

beam splitter means for splitting the light beam into a reference beam and an object beam;

beam directing means for simultaneously directing the object beam along an object beam channel and the reference beam along a reference beam channel to coincide at selected locations during the writing stage of operation;

memory medium means for the storage of a plurality of holograms at different locations of the memory medium means, the memory medium means having a surface proximate a portion of a sphere, the sphere having a center proximate the optical axis of the object beam channel;

page composer means positioned in the object beam channel for creating a bit pattern in the object beam during the writing stage; and reference beam pivoting means for pivoting the reference beam about a reference beam pivot point, the reference beam pivot point being positioned proximate the intersection of the reference beam channel and the sphere.

10. The holographic memory of claim 9 and further comprising object beam pivoting means for pivoting the object beam at an object beam pivot point.

11. The holographic memory of claim 10 wherein the page composer is positioned proximate the object beam pivot point.

12. The holographic memory of claim 11 and further comprising Fourier transform lens means positioned in the object beam channel proximate the page composer means for performing a Fourier transform of the bit pattern produced by the page composer means.

13. The holographic memory of claim 10 wherein the object beam pivot point is positioned proximate the intersection of the object beam channel and the sphere.

14. The holographic memory of claim 9 wherein the beam directing means comprises:

light beam deflector means for deflecting the object and reference beam to a plurality of resolvable positions.

15. The holographic memory of claim 14 wherein the reference beam pivoting means comprises lens means.

16. The holographic memory of claim 15 wherein the lens means comprises:

a first array of individual lenses positioned in the reference beam channel, each lens of the array being positioned at one of the plurality of resolvable positions for reducing the beam diameter of the resolvable positions; and field lens means for pivoting the reference beam at the reference beam pivoting point.

17. The holographic memory of claim 16 wherein the lens means further comprises:

collimating lens means positioned proximate the reference beam pivot point for collimating the reference beam.

* * * * *